United States Patent
Lanz et al.

(10) Patent No.: US 6,288,892 B1
(45) Date of Patent: Sep. 11, 2001

(54) FRONT COVERING FOR A COMPUTER HOUSING

(75) Inventors: Michael Lanz, München; Jürgen Jerg, Scheuring; August Scherer, Dinkelscherben, all of (DE)

(73) Assignee: Siemens Nixdorf Informationssysteme Aktiengesellschaft, Paderborn (DE)

( * ) Notice: Subject to any disclaimer, the term of this patent is extended or adjusted under 35 U.S.C. 154(b) by 0 days.

(21) Appl. No.: 09/142,643

(22) PCT Filed: Mar. 13, 1997

(86) PCT No.: PCT/DE97/00499

§ 371 Date: Sep. 11, 1998

§ 102(e) Date: Sep. 11, 1998

(87) PCT Pub. No.: WO97/34217

PCT Pub. Date: Sep. 18, 1997

(30) Foreign Application Priority Data

Mar. 14, 1996 (DE) .......................................... 296 04 776 U

(51) Int. Cl.⁷ ...................................................... G06F 1/16
(52) U.S. Cl. ...................... 361/683; 361/683; 312/223.1; 312/223.2; 312/223.3
(58) Field of Search ........................ 361/683; 312/223.1, 312/223.2, 223.3

(56) References Cited

U.S. PATENT DOCUMENTS

| | | |
|---|---|---|
| 4,425,014 | 1/1984 | Bleep . |
| 4,810,833 | 3/1989 | Meyers . |
| 4,874,110 | 10/1989 | Klein et al. . |
| 5,164,886 * | 11/1992 | Chang .................................. 361/390 |
| 5,327,683 | 7/1994 | Chu . |
| 5,768,097 * | 6/1998 | Jelinger ................................ 361/683 |
| 5,794,164 * | 8/1998 | Beckert et al. .......................... 701/1 |

FOREIGN PATENT DOCUMENTS

| | | |
|---|---|---|
| 0 674 897 A2 | 10/1994 | (EP) . |
| 0 687 970 A1 | 2/1995 | (EP) . |
| 2 293 493 A | 9/1994 | (GB) . |
| 296 03 161 U1 | 2/1996 | (GE) . |

* cited by examiner

*Primary Examiner*—Gerald Tolin
*Assistant Examiner*—Yean-Hsi Chang
(74) *Attorney, Agent, or Firm*—Schiff Hardin & Waite

(57) ABSTRACT

The invention provides a front cover which, in addition to a front panel, comprises an immediately adjacent function strip which can be equipped optionally with a number of application-specific accessory modules, plug connections, connection sockets, infrared receivers or the like and can have a multi-functional panel, matched to the respective equipment, fitted onto it.

11 Claims, 1 Drawing Sheet

FRONT COVERING FOR A COMPUTER HOUSING

FIELD OF THE INVENTION

The invention relates to a front cover for a computer housing.

The front of computer housings is usually covered by a front panel made of plastic. This front panel has, inter alia, recesses for the installation locations of disk drives, as well as an immobilizing lock, pushbuttons for switching on and off, indicator lamps, possibly an LCD display element, and much more.

The increasing opportunities for the use of a personal computer, particularly in the area of multimedia applications, have produced a series of additional components, and there is very often insufficient space available on the front panel for their connection elements. In order to satisfy the respective customer requirements with regard to these additional components to a sufficient extent, as comprehensive an offer as possible would essentially have to be provided. On the other hand, for space reasons, preference would also have to be given to fitting equipment on an individual basis. However, this would then inevitably require the front panel to have a different layout depending on the equipment of the personal computer, an extravagance which cannot in itself be justified in view of the high tool costs.

U.S. Pat. No. 5,327,683 A discloses a front cover for a computer housing; this cover is designed as a front panel in the form of a frame, and individual wall elements can be releasably inserted into this front panel in the form of a frame.

Furthermore, EP 687 970 A and EP 647 897 A disclose computer housings having attachable front panels, the front having a different layout depending on the accessory equipment required, and having a correspondingly different front panel fitted on it.

Hence, there is a need for a front cover for a computer housing which makes it possible to match the front panel to the various equipment of the computer using the simplest means possible.

SUMMARY OF THE INVENTION

The present invention satisfies the aforenoted needs by providing a front cover for a computer housing. The computer housing includes a front panel having a number of installation locations for externally accessible disk drives. The front cover comprises a front panel comprising an aperture for providing access to at least one disk drive and a longitudinal edge comprising a function strip. The function strip comprises at least one application-specific accessory module selected from the group consisting of a plug connection, a connection socket, a card reader and an infrared receiver. The function strip matably engages a multi-functional panel with at least one aperture for providing access to the at least one application-specific accessory module of the function strip.

In an embodiment, the multi-function panel is detachably connected to the function strip by at least one latching element.

In an embodiment, the multi-functional panel comprises an inner face directed towards the function strip. The inner face comprises a slot for guiding a sliding panel for at least partially covering the aperture disposed in the front panel.

In an embodiment, the function strip comprises a smart-card reader and the multi-functional panel comprises a slot for providing access to the smart card reader.

In an embodiment, the multi-functional panel comprises a lock.

In an embodiment, the function strip comprises at least one plug connection, at least one connection socket, at least one smart-card reader and at least one infrared receiver. Consequently, the function strip comprises a plurality of apertures for providing access to the plurality of application-specific accessory modules of the function strip.

Other objects and advantages of the present invention will become apparent from reading the following detailed description and appended claims, and upon reference to the accompanying drawing.

BRIEF DESCRIPTION OF THE DRAWING

For a more complete understanding of the present invention, reference should now be made to the embodiment illustrated in greater detail and the accompanying drawing and described below by way of an example of the invention.

In the drawing.

Figure 1:
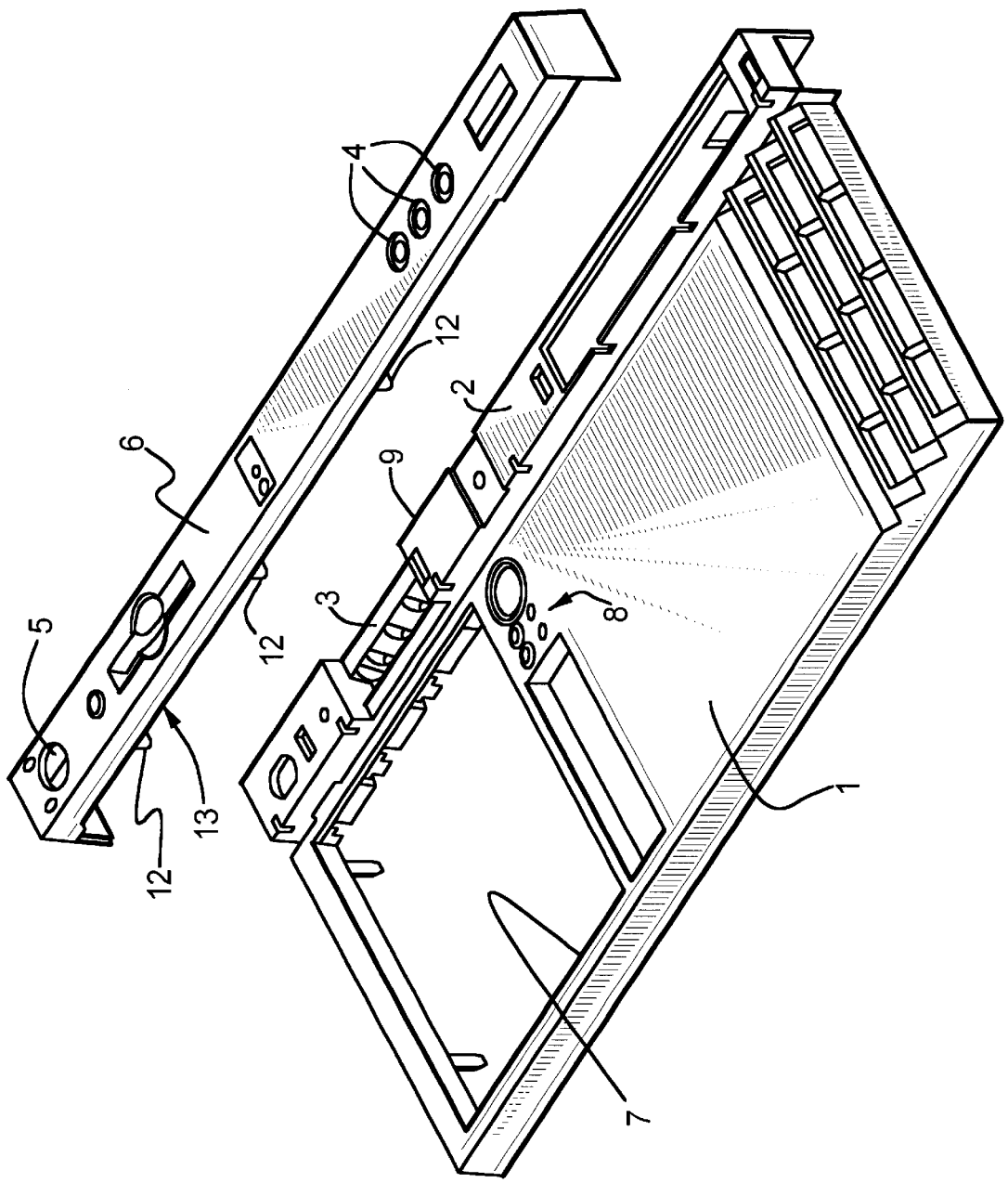
FIG. 1 is an exploded perspective view of the front cover assembly of the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

The following text gives a more detailed explanation of an exemplary embodiment of the invention with the aid of the drawing.

FIG. 1 illustrates a perspective view of a front panel 1 which can be fitted onto the front of a computer housing (e.g. tower design) and has, in its upper region, a rectangular recess 7 for installing disk drives. These installation locations may possibly be protected against unauthorized access by means of a sliding panel not shown. In addition, pushbuttons, indicator lamps and possibly an LCD display element are incorporated in the front panel and shown generally at 8. One of the longitudinal edges 9 of the front panel 1 includes a function strip 2 integrally formed on it. The function strip 2 can be equipped optionally with a number of application-specific accessory modules, such as smartcard readers 3, plug connections, connection sockets 4 or the like. Instead of the connection sockets 4 for loudspeakers, headphones or a microphone, an infrared receiver may also be provided, for example, for the remote control of the personal computer working in multimedia mode. An immobilizing lock 5, which is normally provided in the front panel 1, may also be accommodated in the function strip 2 or a multi-functional panel 6 which may be provided to cover the individual components in the function strip 2. The multifunctional panel 6 extends in the manner of a cover and whose individual shape is matched to the respectively chosen equipment in the function strip 2. When adding or changing components in the function strip 2, it is then only necessary to replace the previously used multifunctional panel with a new multifunctional panel adapted accordingly. The larger front panel 1 can continue to be used without being changed, however.

Expediently, the multifunctional panel 6 is detachably mounted on the function strip by means of latching elements 12. Furthermore, on its inner face pointing toward the front panel 1, the multifunctional panel may be provided with a recess or a guide slot 13 for laterally guiding a sliding panel which can move in front of the disk drives disposed behind the aperture 7.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A front cover for a computer housing, the computer housing including a front receiving the front cover and having a number of installation locations for externally accessible disk drives, the front cover comprising:

a front panel comprising an aperture for providing access to at least one disk drive and having a longitudinal edge; a function strip being integrally formed on the longitudinal edge and comprising at least one application-specific accessory module selected from the group consisting of a plug connection, a connection socket, a smart-card reader and an infrared receiver; and a multi-functional panel being matably engaged on the function strip, said multi-functional panel having at least one aperture for providing access to the at least one application-specific accessory module of the function strip.

2. The front cover of claim 1 wherein the multi-functional panel is detachably connected to the function strip by at least one latching element.

3. The front cover of claim 1 wherein the multi-functional panel comprises an inner face directed towards the function strip, the inner face comprising a slot for guiding a sliding panel for at least partially covering the recess disposed in the front panel.

4. The front cover of claim 1 wherein the function strip comprises a smart-card reader and the multi-functional panel comprises a slot for providing access to the smart-card reader.

5. The front cover of claim 1 wherein the multi-functional panel comprises a lock.

6. A front cover for a computer housing, the computer housing including a front receiving the front cover and having a number of installation locations for externally accessible disk drives, the front cover comprising:

a front panel comprising a longitudinal edge; a function strip being provided along the longitudinal edge comprising a plurality of application-specific accessory modules including a plug connection, a connection socket, a smart-card reader and an infrared receiver; and a multifunctional panel being matably engaged on the function strip, said multi-functional panel having a plurality of apertures for providing access to the plurality of application-specific accessory modules of the function strip.

7. The front cover of claim 6 wherein the multi-functional panel is detachably connected to the function strip by at least one latching element.

8. The front cover of claim 6 wherein the multi-functional panel comprises an inner face directed towards the function strip, the inner face comprising a slot for guiding a sliding panel for covering the recess disposed in the front panel.

9. The front cover of claim 6 wherein the multi-functional panel comprises a slot for providing access to the smart-card reader.

10. The front cover of claim 6 wherein the multi-functional panel comprises a lock.

11. A front cover for a computer housing, the computer housing including a front having a number of installation locations for externally accessible disk drives, the front cover comprising:

a front panel comprising a longitudinal edge; a function strip being provided along the longitudinal edge, the function strip comprising a plurality of application-specific accessory modules including a plug connection, a connection socket, a smart-card reader and an infrared receiver; and a multi-functional panel matably engaging the function strip and having at least one aperture for providing access to the plurality of application-specific accessory modules of the function strip, the multi-functional panel being detachably connected to the function strip by at least one latching element, the multi-functional panel having an inner face directed towards the function strip, the inner face having a slot for guiding a sliding panel for covering the recess disposed in the front panel, the multi-functional panel having a slot for providing access to the smart-card reader and a lock.

* * * * *